United States Patent
Yasuda et al.

(10) Patent No.: US 7,268,494 B2
(45) Date of Patent: Sep. 11, 2007

(54) COMPACT FLUORESCENT LAMP AND LUMINAIRE USING THE SAME

(75) Inventors: Takeo Yasuda, Kanagawa-ken (JP); Kunihiko Ikada, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 100 days.

(21) Appl. No.: 11/124,383

(22) Filed: May 9, 2005

(65) Prior Publication Data

US 2005/0265018 A1    Dec. 1, 2005

(30) Foreign Application Priority Data

May 7, 2004    (JP) ............................. 2004-138568

(51) Int. Cl.
*F21S 8/00* (2006.01)
*H01J 1/62* (2006.01)

(52) U.S. Cl. ............ 313/634; 313/318.12; 313/318.01; 362/216; 362/218

(58) Field of Classification Search ................ 313/493, 313/623, 634, 637–639; 362/216, 218
See application file for complete search history.

(56) References Cited

U.S. PATENT DOCUMENTS

| | | | | |
|---|---|---|---|---|
| 2,399,222 | A * | 4/1946 | Germeshausen | ............. 362/10 |
| 4,503,360 | A * | 3/1985 | Bedel | ......................... 315/112 |
| 6,296,375 | B1 * | 10/2001 | Sung et al. | ................. 362/255 |
| 6,400,104 | B1 * | 6/2002 | Ham | ........................... 315/312 |
| 6,437,502 | B1 | 8/2002 | Nishio et al. | |

(Continued)

FOREIGN PATENT DOCUMENTS

JP    61-63759    4/1986

(Continued)

OTHER PUBLICATIONS

Yasuda, Takeo, 2002 Manuscript of Japan Lighting Society National Conference No. 7.

(Continued)

*Primary Examiner*—Ali Alavi
*Assistant Examiner*—Anabel Ton
(74) *Attorney, Agent, or Firm*—Pillsbury Winthrop Shaw Pittman, LLP (57) ABSTRACT

A compact fluorescent lamp comprises a fluorescent tube having a helical portion on at least a part thereof and turned down in the middle, a pair of tube ends thereof each provided with a discharge electrode, the pair of tube ends juxtaposing with each other in the same direction, a holder for holding the tube ends so as that the fluorescent tube is supported at the one side thereof, a lighting device for supplying a high-frequency power to the fluorescent tube, the lighting device comprising a circuit board facing the other side of the holder and circuit elements mounted on the circuit board, a cover for accommodating the lighting device, the cover opening at both ends and holding the holder at the one opening end, and a cap fixed to the other opening end of the cover for supplying a commercial power to the lighting device by being mounted to a socket of luminaire, wherein a thin tube is protruded from at least one of the tube ends of the fluorescent tube in the cover, and the thin tube is communicated with the fluorescent tube.

14 Claims, 5 Drawing Sheets

U.S. PATENT DOCUMENTS

| | | | |
|---|---|---|---|
| 6,513,948 B1* | 2/2003 | Noh | 362/216 |
| 6,515,433 B1* | 2/2003 | Ge et al. | 315/227 R |
| 6,607,290 B2* | 8/2003 | Matsuba et al. | 362/294 |
| 6,633,128 B2* | 10/2003 | Ilyes et al. | 313/634 |
| 6,759,797 B2* | 7/2004 | Tokes et al. | 313/318.01 |
| 6,781,315 B2 | 8/2004 | Nishio et al. | |
| 7,064,488 B2* | 6/2006 | Tomiyoshi et al. | 313/634 |
| 7,067,981 B2* | 6/2006 | Nishio et al. | 315/56 |
| 2002/0190625 A1* | 12/2002 | Tokes et al. | 313/318.01 |
| 2003/0223230 A1* | 12/2003 | Li | 362/216 |
| 2003/0234614 A1* | 12/2003 | Itaya et al. | 313/634 |
| 2004/0263079 A1* | 12/2004 | Nakanishi et al. | 313/631 |
| 2005/0258760 A1* | 11/2005 | Yan | 313/634 |

FOREIGN PATENT DOCUMENTS

| | | |
|---|---|---|
| JP | 2000-228169 | 8/2000 |
| JP | 3262168 | 12/2001 |

OTHER PUBLICATIONS

JIS C 7501, 2000 Tungsten Filament Lamps for General Lighting Purposes.

* cited by examiner

FIG. 6

COMPACT FLUORESCENT LAMP AND LUMINAIRE USING THE SAME

CROSS-REFERENCE TO RELATED APPLICATIONS

This application is based upon and claims the benefit of priority from the prior Japanese Patent Application JP2004-138568 filed on May 7, 2004, the entire content of which is incorporated herein by reference.

FIELD OF THE INVENTION

This invention relates to a compact fluorescent lamp and luminaire using the same.

BACKGROUND OF THE INVENTION

In recent years, compact fluorescent lamps have been downsized in comparable to ordinary incandescent lamps, and invite an increasing replacement demand from such incandescent lamps.

As an example of such a compact fluorescent lamp, Japanese patent application Tokkai 2000-228169 (prior art A) discloses those wherein a fluorescent tube is helically packed.

However, there is a tendency that a heat dissipation efficiency of fluorescent tubes falls down and thus the temperature thereof rises up, along with the downsizing thereof. Such a tendency is especially remarkable in a compact fluorescent lamp in which the fluorescent tube is accommodated in a globe for assimilating its appearance to the ordinary incandescent lamp. When fluorescent-tube encapsulating mercury therein is heated to high temperature, a mercury vapor pressure in the fluorescent tube rises excessively, and its light output falls. Therefore, Japanese Patent 3262168 (prior art B) proposes a technique for optimizing the mercury vapor pressure, raising the mercury vapor pressure at a lighting start, and improving the light flux rise-up characteristic by putting an amalgam mercury and any one of indium, lead, tin, bismuth, etc. in the vicinity of discharge electrode of the fluorescent tube.

On the other hand, Japanese utility patent application Sho 61-63759 (Prior Art C) proposes a technique for inducing a cool spot presenting a desirable temperature capable of holding a high mercury vapor pressure in a low temperature state even in a light-out time to improve the light flux rise-up characteristic by protruding a thin tube from the fluorescent tube, without amalgam. However, Prior art C has a drawback that in case of the fluorescent tube being enclosed in a globe, the temperature of the cool spot fails to fall to a desired temperature, since the heat generated by the So, a cool spot with a desired temperature can be induced on the thin tube by dividing the inside of an envelope containing the globe into a can be divided into a fluorescent tube compartment and a lighting device compartment with a partition, and then protruding the thin tube from the tube end into the lighting device compartment by 5-20 mm long.

In the prior art B provided with a main amalgam and an auxiliary amalgam, mercury transfers from the main amalgam to the auxiliary amalgam lasting for about several weeks or several months until the mercury vapor pressure reaches an equilibrium state after the lamp has lighted out. However, according to an experiment using, for example, an absorption method, the change of the mercury vapor pressure becomes very gradual afterward about 10 hours from the time the light-out. It has been found that in the meantime the mercury vapor pressure is determined by broadly the composition of the main amalgam. (see "2002 Manuscripts of Japan Lighting Society National Conference, No. 7) The mercury vapor released from the auxiliary amalgam near the discharge electrode diffuses toward the center of the fluorescent tube, and spreads entirely in the fluorescent tube within broadly several minutes. The entire of the lamp reaches thermal equilibrium within broadly several tenths of minutes to one hour. At that time, the mercury vapor pressure becomes constant at a vapor pressure determined by the temperature of the main amalgam. At that time, the auxiliary amalgam is 100 degrees C. or more, or in some situations, 200 degrees C. or more. As a result, most mercury is substantially released from the auxiliary amalgam (to be exact, metal substance such as indium constituting the auxiliary amalgam).

However, even a fluorescent lamp equipped with auxiliary amalgam is difficult to raise promptly the mercury vapor pressure just after a lighting start, and to assure a desired lightness.

In a globe-less compact fluorescent lamp, even if a cool spot is inducing on a portion of the fluorescent tube, there is a case that the cool spot fails to become a sufficient low temperature depending to its posture. Merely by dividing the inside of the envelope with a partition and protruding a thin tube into a lighting device compartment by slightly around 5-20 mm, the fluorescent tube compartment is left at a high temperature. So that the protruding portion fails to be sufficiently cooled. In a state that the mercury vapor pressure is relatively high during a light-out state, major part of mercury vapor in the fluorescent tube is converging on the cool spot. Therefore, it takes a long time until the lamp gets warm to the temperature for releasing the mercury vapor from the cool spot by which mercury vapor is emitted from a cool spot at a re-lighting.

The present invention has an object to provide a compact fluorescent lamp having a favorable light flux rise-up characteristic and luminaire using the same, in consideration of resolving the problems as described above.

SUMMARY OF THE INVENTION

The compact fluorescent lamp according to the first aspect of the present invention, comprising a fluorescent tube having a helical portion on at least a part thereof, a pair of tube ends each provided with a discharge electrode, the pair of tube ends being directed in the same direction from a turnover portion thereof and placed side by side with each other, a holder for holding the tube ends so as that the fluorescent tube is supported at the one side thereof, a lighting device for supplying a high-frequency power to the fluorescent tube, the lighting device comprising a circuit board facing the other side of the holder and circuit elements mounted on the circuit board, a cover for accommodating the lighting device, the cover opening at both ends and holding the holder at the one opening end, and a cap fixed to the other opening end of the cover for supplying a commercial power to the lighting device by being mounted to a socket of luminaire, wherein a thin tube is protruded from at least one of the tube ends of the fluorescent tube in the cover, and the thin tube is communicated with the fluorescent tube.

The compact fluorescent lamp according to the second aspect of the present invention, is characterized by that the thin tube is located in an area that a surface temperature of at least a part of the thin tube becomes 40-70 degrees C.

The compact fluorescent lamp according to the third aspect of the present invention, is characterized by that the thin tube is protruded by 25-70 mm from the circuit board.

The compact fluorescent lamp according to the fourth aspect of the present invention, is characterized by that the thin tube is protruded in an interior of the cap.

The compact fluorescent lamp according to the fifth aspect of the present invention, is characterized by that the thin tube is thermally coupled to the cap.

The compact fluorescent lamp according to the sixth aspect of the present invention, is characterized by that the circuit element comprises an electrolytic capacitor highly protruding from the circuit board, and at least another circuit element lowly protruding from the circuit element, and the thin tube is protruding substantially to the same height with the electrolytic capacitor.

The compact fluorescent lamp according to the seventh aspect of the present invention, is characterized by that the thin tube is protruding by 5-50 mm from the circuit board.

In compact fluorescent lamps, inside the envelope is tend to become relatively high temperature, since the lighting device and the fluorescent tube are encapsulated in a narrow envelope, due to the heat radiated from the fluorescent tube. Accordingly, even if a portion of the thin tube is protruding to the vicinity of the cap and resides very far from the fluorescent tube, the portion is easily affected by the heat due to that the thin tube is physically connected to the fluorescent tube.

In ordinary fluorescent lamps, its luminous efficiency becomes maximum when the mercury vapor pressure in the fluorescent tube is in a range of 1-2.4 Pa. In ordinary fluorescent lamps wherein mercury itself is capsulated as a discharge gas source, the mercury vapor pressure can be maintained at an optimal state in the fluorescent tube by letting the temperature at a portion of the fluorescent tube is in the range of 40-60 degrees C.

However, in the compact fluorescent lamp in which the fluorescent tube tends to reach a high temperature, it is difficult to let a portion of the fluorescent tube be in the range of 40-60 degrees C.

The inventors examined a temperature and a protrusion length of thin tube capable of obtain a light flux rise-up characteristic equivalent to ordinary fluorescent lamps and a light output characteristic during steady state lighting state, by protruding a thin tube from a tube end of a fluorescent tube of compact fluorescent lamp to induce a cool spot on a portion of the thin tube.

The inventors ascertained that when measured temperatures of various portions of lighted compact fluorescent lamp in a posture that a cap of the compact fluorescent lamp takes upper position, the temperature of the space where principal circuit elements of lighting device are tightly-packed was close to 100 degrees C., while the temperature of the space upward the principal circuit elements and in the vicinity of the cap was relatively low of 40-50 degrees C. One conceivable reason is that an air convection is scarce in the cover in that posture. Here, as circuit elements constituting the lighting device, there are high heat evolution circuit elements with relatively high heat evolution per unit capacity whose surface temperature become around 70 degrees C. during normal lighting state and low heat evolution circuit elements with relatively low heat evolution per unit capacity whose surface temperature is 70 degrees C. or less during normal lighting state. Here, low height circuit elements which locally reach a high temperature are not included in the high heat evolution circuit element. Since electrolytic capacitors are low heat evolution circuit elements, even if it protruding higher than the high heat evolution circuit elements and nearer the cap, the temperature in the vicinity of the cap is relatively low.

For maximizing the light output of fluorescent lamp, the thin tube must be placed in a space of a temperature in a range of 40-80 degrees C., or preferably in a range of 40-75 degrees C., or more preferably in a range of 40-70 degrees C. at a normal lighting state. Particularly, in a thin tube which protrudes from tube end of fluorescent tube where discharge electrodes are mounted tends to be influenced of the heat generated from the discharge electrodes. For avoiding the influence of heat, the thin tube is required to be lengthy protruded from the tube end of fluorescent tube by 25 mm or more to the vicinity of the cap in a low temperature area. If the protrusion length of the thin tube is 25 mm or less, the temperature of a thin tube fails to fall enough, since the entire of the thin tube is heavily influenced of the heat from the discharge electrode.

In the meantime, if the thin tube is too lengthy, for example 70 mm or more, the thin tube fails to be fit in the cover. Furthermore, if the thin tube is so lengthy, a luminous efficiency might fall, since the temperature in the space of cover near the cap is lower than the temperature at that the mercury vapor pressure is optimum and thus the mercury vapor pressure fails to be kept suitable. Furthermore, if the thin tube is so lengthy, it becomes difficult to secure a space for fitting the thin tube, since circuit elements of lighting device tightly packed in the limited narrow space of the cover. Therefore, it is preferable that the protrusion length of the thin tube is preferable to be in the range of 25-70 mm. However, even if the thin tube is protruding to the region near the cap in the cover, the temperature of the thin tube rises over 70 degrees C., or in some situations, rises 80 degrees C., depending to its posture.

In order to induce a temperature portion on the thin tube capable of obtaining a mercury vapor pressure for maximizing the light output, the thin tube is preferable to protrude to the vicinity of the cap in the cover or inside the cap. Furthermore, a portion of the thin tube can be contacted to the inner wall or the inner wall of the cap. In this case, if the thin tube is coupled to the cap by using agent with high thermal conductivity, for example, silicone resin, they are combined with a thermally favorable relation, and thus the thin tube is able to exert a high temperature lowering effect.

Furthermore, the thin tube can be rolled along the inner wall of the cover. Otherwise, the thin tube might be lengthy extended simply. Then, a heat conduction from the discharge electrode to the thin tube is depressed.

Here, it is possible to employ amalgam with a vapor pressure close to that of mercury just after the lighting start. Furthermore, the main amalgam may reside in the vicinity of the tube end of the fluorescent tube, or in the vicinity of the tip end of the thin tube.

Here, it is able to place an auxiliary amalgam in the fluorescent tube other than mercury or main amalgam, for increasing diffusion of mercury vapor just after the lighting start. Here, In the case of that the inside of a fluorescent tube becomes adequate mercury vapor pressure just after the lighting start, the auxiliary amalgam is not necessarily required.

Here, the term "normal lighting state" means the state that the compact fluorescent lamp is not covered with a lighting equipment etc., and the compact fluorescent lamp is lighted up normal temperature of around 25 degrees C.

In the case of the electrolytic capacitor being taller than other circuit elements and protruding to the vicinity of the cap, the thin tube is protruded to the height on par with the electrolytic capacitor. It is common that the lighting device equips with an electrolytic capacitor, but it is not limited thereto. Furthermore, the circuit board of lighting device is supported directly or indirectly by the cover. The circuit board is placed by orthogonally crossing the longitudinal direction of the compact fluorescent lamp. However, it is allowable to be parallel or oblique to the longitudinal direction of the compact fluorescent lamp.

It is confirmed that in the cover the farther the distance is away from the fluorescent tube the lower the temperature descends. This is because the radiation heat from the fluorescent tube is shielded by the circuit board.

Furthermore, the temperature in the cap is lower than that in the cover, since the heat of the cap is radiated through a socket.

At a position distant by 5 mm or more from the circuit board, the temperature in the cover becomes lower enough than the fluorescent tube side.

At a position distant by 10 mm or more from the circuit board, the temperature becomes in the range of 40-70 degrees C. Therefore, if the thin tube is protruding for 10 mm or more from the circuit board, the mercury vapor pressure in the fluorescent tube can be adequately controlled, and thus the light output can be heightened. So, for example, it is sufficient that the thin tube may protrude in the range of around 5-50 mm, or preferably in the range of 10-50 mm, or optimally in the range of 15-40 mm.

As helical fluorescent tubes, there are a thing that a straight glass tube is folded at a prescribed portion by softening with heat and then both folded sides are helically deformed in parallel with each other, or those that a straight glass tube is folded in similar to the above thing at a prescribed portion by softening with heat and then one of the folded sides is helically deformed while the other of the folded sides is straightly extended by running through the helical axis of the former side.

Here, the fluorescent tube may not be made of glass, but may be made of materials having translucency and airtightness. For example, as such materials there is ceramics.

The fluorescent tube is coated directly or indirectly on its inner surface with a fluorescent substance layer. There are rare earth metal oxide phosphor, halo-phosphate phosphor, etc., as the phosphor. In order to enhance the luminous efficiency of the phosphor, three band emission fluorescent substance comprising phosphors respectively emitting red, blue and green lights is preferable.

Since the light flux retention of fluorescent lamps is influenced by the thicknesses of protective film and a fluorescent substance layer, it is preferable that the combined thickness thereof becomes uniform over the entire length of the fluorescent tube. However, in the case of that the protective film and the fluorescent substance layer are coated by pouring those solutions into the fluorescent tube from the upper end opening thereof and then running them out from the lower opening end thereof by standing the fluorescent tube in the vertical posture, the thicknesses thereof result in differences between the vicinities of the upper end and the lower end of the fluorescent tube. Therefore, if the fluorescent tube is turned upside down at the time of forming the protective film and the time of forming the fluorescent substance layer, the thickness differences of the protective film and the fluorescent substance layer between the vicinities of the upper end and the lower end of the fluorescent tube are counterbalanced with each other, and thus the combined thickness thereof is unified.

The fluorescent tube is equipped with discharge electrode on its both tube ends. For the discharge electrode, hot cathodes comprising filament, ceramic electrodes carrying electron emitting substance, cold electrodes comprising nickel etc. are employed The fluorescent tube is filled with discharge gas. For the discharge gas, inactive gas such as argon, neon, krypton, xenon etc. and mercury vapor are employed.

The thin tube can be produced by shrinking the tube end of the fluorescent tube. Or it is also able to be produced by welding an independent thin tube to the tube end of the fluorescent tube. The thin tube may be employed as a main amalgam enclosure, or an exhaust pipe. The tube end may be sealed using a flare stem or press-sealed.

For the cap, a screw type cap so-called E26 type cap conventionally employed for incandescent lamps is employed, but it is not limited thereto. The cap is not required to be directly mounted to the cover, but it may be indirectly mounted thereto. Or the cap may be constructed in integral with the cover.

One aspect of the compact fluorescent lamp according to the present invention is so constituted that a fluorescent tube is helically deformed at least a part thereof, and folded at a portion thereof, and the tube ends on both folded sides are placed in parallel in the same direction. As a result, a compact fluorescent lamp with relatively long discharge path is obtained. A thin tube communicating to the fluorescent tube is protruded from at least one of the tube ends of the fluorescent tube. A part of the thin tube can be set at a temperature by that a mercury vapor pressure maximizing the luminous efficiency is obtained, by protruding the thin tube to the vicinity of the cap. As a result, the luminous efficiency of fluorescent tube is enhanced, as compared to conventional amalgam with low mercury vapor pressure Another aspect of the compact fluorescent lamp according to the present invention is characterized by that the thin tube is helically protruding along the inner wall of the cover.

In this aspect of the compact fluorescent lamp, whole of the fluorescent tube including tube ends are helically formed, and the thin tube is also helically protruding from one of the tube ends just as the fluorescent tube is. Here, besides the above construction, the thin tube may be helically formed by only the portion in the vicinity of the cap. The helical thin tube is so constituted that it coincides with the helical locus of the fluorescent tube, but both helical locus may be not needed to coincide.

According to this aspect of the compact fluorescent lamp, the thin tube can be formed in relatively long length.

Still another aspect of the compact fluorescent lamp according to the present invention is characterized by that the thin tube is protruding into the inside of the cap, and the thermally coupled to the cap. According to this aspect of the compact fluorescent lamp, the temperature of the thin tube is furthermore lowered. So that, the compact can be entirely miniaturized, or further high-powered.

As such a thermally coupling means, silicone can be employed. In this case, by using silicone with relatively low hardness, vibration transmitted from the cap to the thin tube is buffered by the silicone and thus the thin tube can be prevented from breakage failure.

Still another aspect of the compact fluorescent lamp according to the present invention is characterized by that at least a part of the thin tube is placed in the area in the cover where its surface temperature becomes in the region of 40-70 degrees C.

As an example of such an area, there is the space in the cap. Besides the space in the cap, there are other cases depending to the dimension or the shape of the cap, the output or the mounting structure of the discharge device.

According to this aspect of the compact fluorescent lamp, a part of the thin tube can be set at a temperature by that a mercury vapor pressure maximizing the luminous efficiency is obtained Still another aspect of the compact fluorescent lamp according to the present invention is characterized by that a cool spot controlling a mercury vapor pressure in the fluorescent tube is induced on the helical portion of the fluorescent tube, and the fluorescent tube is filled with a discharge gas containing at least mercury and having vapor pressure characteristic substantially the same with that given by mercury itself.

The above-mentioned vapor pressures substantially the same with that given by mercury itself is the vapor pressure normal temperature (25 degrees C.).

According to the above aspect of the compact fluorescent lamp, it is able to employ a fluorescent tube enclosing mercury itself or a mercury carrier therein without enclosing amalgam. To give some actual examples for the mercury carrier, there are a titanium-mercury alloy such as "GEMEDIS®" available from SAES Getters S.p.A., Italy, a mercury alloy such as zinc amalgam which substantially fails to control mercury vapor pressure and fails to absorb mercury so that it affects a light output during lighting-up of the fluorescent tube, and does not control mercury vapor pressure substantially, and a capsule made of unorganic substance such as glass, ceramics etc., and accommodating therein liquid mercury. When the mercury carrier is heated, mercury evaporates and emits therefrom. Therefore, since the mercury vapor pressure of the fluorescent tube is not controlled by main amalgams, the mercury vapor pressure characteristic of the fluorescent tube is almost equivalent to ordinary fluorescent lamps enclosing mercury itself therein.

According to this aspect of the compact fluorescent lamp, a cool spot is induced on the thin tube during steady state lighting, and the fluorescent tube is able to have the vapor pressure characteristic equivalent to that given by mercury itself. As a result, the light output during steady state lighting is not deteriorated, and also the light flux rise-up characteristic is enhanced.

Still another aspect of the compact fluorescent lamp according to the present invention is characterized by that the thin tube accommodates a main amalgam comprising mercury and at least one of bismuth, lead, zinc and tin, and mercury, and the content of the mercury is more than three mass %.

The mercury release/absorption characteristic of the main amalgam is determined by amalgam establishing metal. Here, as the amalgam establishing metal, bismuth, lead and zinc are most suitable. Therefore, amalgam thereof, for example, bismuth-tin-mercury amalgam, bismuth-tin-lead-mercury amalgam, zinc-mercury amalgam, etc. are employed. However, it is not restricted to them. According to this aspect of the compact fluorescent lamp, much amount of mercury deposits to the surface of the main amalgam, and thus the light flux rise-up characteristic is enhanced.

In order to improve the light flux rise-up characteristic and the light output characteristic during steady state lighting, the inventors examined the temperature of the thin tube, the protrusion length of the thin tube, and the temperatures of the main amalgam and the thin tube during steady state lighting.

First, the inventors have been studied locations and temperatures of the main amalgam for raising the mercury vapor pressure in the fluorescent tube.

For example, lighted-up a compact fluorescent lamp enclosing a main amalgam comprising bismuth-tin-mercury alloy in the ambient temperature of 25 degrees C. At that time, the temperature of the main amalgam was 50-70 degrees C. And, the mercury vapor pressure in the fluorescent tube was in the favorable state in the range of 1.0-2.4 Pa, Here, a more preferable mercury vapor pressure is 1.5-2.4 Pa. A main amalgam comprising bismuth-indium-mercury alloy is able to control the mercury vapor pressure in the fluorescent tube around the optimal value of one Pa, even in the range of 90-130 degrees C.

However, since the mercury vapor pressure of such main amalgam is lower than that of mercury itself by one or more order of magnitude, the light flux rise-up was not favorable when the lamp has lighted up at an ambient temperature of 25 degrees C., after a long lights-out time. This is because the mercury vapor pressure just after the lighting start is around 0.1 Pa, the discharge electrodes generate heat, and the light flux is left short until reaching a high-temperature ambient atmosphere. Therefore, since the necessity of controlling the mercury vapor pressure by the main amalgam in excessively low state is drawn out by lowering the temperature of the main amalgam during steady state lighting, the mercury vapor pressure just after the lighting start can be raised and thus the light flux rise-up characteristic is improved.

Therefore, lighted up the compact fluorescent lamp in which the main amalgam was located at a portion of the thin tube residing in the vicinity of the cap. As a result, the light flux rise-up just after the lighting start became favorable, the light flux during steady state lighting failed to fall, either, and the light output characteristic was improved.

And, by protruding the thin tube by 25-70 mm, It became possible to induce a portion at a temperature capable of controlling the mercury vapor pressure in the fluorescent tube, on the thin tube. This is because that by the main amalgam residing in the vicinity of the cap the temperature of the main amalgam was kept in the range of 50-60 degrees C. optimizing the mercury vapor pressure in the fluorescent tube.

In compact fluorescent lamps, it is common to employ amalgam, but it is not limited thereto According to this aspect of the compact fluorescent lamp, the composition of the main amalgam is optimized and the light flux rise-up characteristic is enhanced.

Still another aspect of the compact fluorescent lamp according to the present invention is characterized by that besides the main amalgam an auxiliary amalgam comprising gold, silver, palladium, platinum, a lead, zinc, bismuth, or tin is enclosed as a primary constituent in the fluorescent tube.

By the way, the inventors examined the light flux rise-up characteristic of compact fluorescent lamps wherein a main amalgam was placed in the thin tube at a vicinity of the cap, but auxiliary amalgams did not reside. In the compact fluorescent lamps, a certain degree of lightness had been obtained just after the lighting start. However immediately after that, the light flux had decrease, and an obscure lighting state had lasted for several minutes, and then the lamps lighted at a mercury vapor pressure controlled by the main amalgam. It is considered that the above phenomenon occurred by the state where the mercury vapor had absorbed into the fluorescent substance layer and the protection layer on the inner wall of the fluorescent tube and thus the mercury vapor ran short had lasted for a while after the lighting start. That is, although liquid mercury remaining in the fluorescent tube evaporates in a discharge space and results to mercury vapor along with the lighting start, the state where mercury vapor ran short occurs because of that in the fluorescent substance layer, the protection layer, and the glass of the fluorescent tube there is one having a nature of absorbing the mercury vapor and thus when the absorption amount of the mercury is larger than the vaporizing amount of the mercury, and the phenomenon that the fluorescent tube lights obscurely arises.

The above phenomenon rarely occurs in the case where the main amalgam is enclosed in a short thin tube, while it frequently occurs in the case where the main amalgam is enclosed on the position in the vicinity of the cap of lengthy thin tube protruding through a circuit board. That is, when the main amalgam in placed in the vicinity of the cap, the mercury vapor vaporized from the main amalgam propagates into the fluorescent tube, and then diffuses in the discharge space. Since the thin tube is long and lender, the propagation and the diffusion of the mercury vapor to the discharge space progress very slowly. As a result, the state that the fluorescent tube lights up obscurely lasts for several minutes.

Therefore, the inventors placed an auxiliary amalgam in the fluorescent tube, in contemplating that a certain amount of mercury vapor is kept in the discharge path during light-out and the light flux rise-up just after the lighting start is improved. Then, first, in order to investigate a light output characteristics, total light flux and the light flux rise-up characteristic were measured on various composition of the main amalgam and the auxiliary amalgam and various length of the thin tube. As a result, it was ascertained that in the compact fluorescent lamp wherein a main amalgam was placed in the vicinity of a cap the total light flux during steady state lighting was adequate. However, it was found that the light flux rise-up characteristic differed in dependent on compositions of the auxiliary amalgam. This is because that the main amalgam was placed on the position in the vicinity of the cap of the thin tube, and thus the diffusion of the mercury vapor slowed down and the mercury vapor pressure in the fluorescent tube is governed by the mercury vapor released from the auxiliary amalgam placed into the fluorescent tube just after the lighting start.

Next, the inventors examined about an optimization of auxiliary amalgams. Auxiliary amalgams must function not to drastically lower mercury vapor pressure. On this point, it was found that indium conventionally employed for auxiliary amalgam was inadequate since indium had strong mercury absorptivity, and thus it was difficult to emit proper amount of mercury vapor just after the lighting start. So, the inventors ascertained that it was rather preferable to employ metal whose mercury absorptivity was not so strong for auxiliary amalgam. As such metal substance for auxiliary amalgam, gold, silver, palladium, platinum, a lead, zinc, bismuth, tin, etc. are employed. In particular, gold and silver are suitable. For example, in the case of 12 W compact fluorescent lamp equivalent to 60 W incandescent lamp, the optimal amount of mercury in the fluorescent tube is about two microgram. Therefore, it is sufficient that the auxiliary amalgam absorbs about 20 microgram of mercury the ten times of the optimum amount of mercury.

Auxiliary amalgam is placed in a desired location in the vicinity of the discharge electrode or in the discharge path, in the form of foil of gold or silver, or in the state of gold or silver plated on weld of stainless steel foil etc. Here, the primary constituent of metal substance for forming auxiliary amalgam means things on that metal substance for forming amalgam by absorbing mercury vapor in the fluorescent tube to a base metal plate comprising heat-resistant metal, such as stainless steel, iron-nickel alloy, etc., while it does not include the base metal plate itself.

Generally, in order to make mercury vapor emit promptly just after the lighting start, auxiliary amalgam is placed in the vicinity of the discharge electrode. In the fluorescent lamp enclosing main amalgam with a mercury vapor pressure close to that of mercury itself at normal temperature, it is able to improve a delay of light flux rise-up by employing auxiliary amalgam which supplies mercury vapor until the mercury trapped on the cool spot is vaporized.

According to this aspect of the compact fluorescent lamp, although the main amalgam is placed in remote position from the fluorescent tube, the composition of the auxiliary amalgam is optimized. So that, the decreasing of light flux due to the shortage of mercury just after the lighting start is depressed, and the light flux rise-up characteristic can be enhanced certainly.

Still another aspect of the compact fluorescent lamp according to the present invention is characterized by that a glove is mounted to the cover so as that the fluorescent tube is accommodated therein. Furthermore, it is characterized by that the maximum diameter of the globe is 70 mm or less.

If the globe is of light permeability, it may be either of light diffusivity and light transparency, and it may be prepared pattern or coloring. The material of the globe may be either of glass and plastics. Although the shape of the globe may be arbitrary designed, it is able to employ a shape so-called Type-A which is close to the popular incandescent lamp, a roughly round shape so-called Type-G, a cylindrical and tip-rounded shape so-called Type-T, etc.

Here, in the compact fluorescent lamps having a globe, the temperature in the cover rises up. Therefore, it must be employed amalgams with low mercury pressure. As a result, there is a problem that the light flux rise-up characteristic is poor.

A compact fluorescent lamp in still another aspect of the invention is characterized by that the rated lamp power of the fluorescent tube is comparable to that of a 100 W incandescent lamp, the fluorescent tube is accommodated in a globe having a maximum diameter of 65 mm or less, which is attached to the cover, and the entire length of the compact fluorescent lamp across the cap to the globe is 140 mm or less.

A compact fluorescent lamp in still another aspect of the invention is characterized by that the fluorescent tube is accommodated in a globe having a maximum diameter of 65 mm or less, which is attached to the cover, and the entire length of the compact fluorescent lamp across the cap to the globe is 109 mm or less. A compact fluorescent lamp in still another aspect of the invention is characterized by that the rated lamp power of the fluorescent tube is comparable to that of a 40 W incandescent lamp, the fluorescent tube is accommodated in a globe having a maximum diameter of 65 mm or less, which is attached to the cover, and the entire length of the compact fluorescent lamp across the cap to the globe is 98 mm or less. In the three aspects of compact fluorescent lamps, the optimal condition on the size equivalent to the typical incandescent lamp of those predetermined rated lamp electric powers is specified.

In still another aspect of the invention, luminaire comprises any one of the above described compact fluorescent lamps and luminaire body for loading the compact fluorescent lamp.

According to the above aspect of invention, it is able to provide luminaire equipped with either one of the above aspects of compact fluorescent lamps.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the attached drawings, FIGS. 1 to 5, preferred embodiments of the compact fluorescent lamps according to the present invention will be explained hereinafter.

Figure 1:
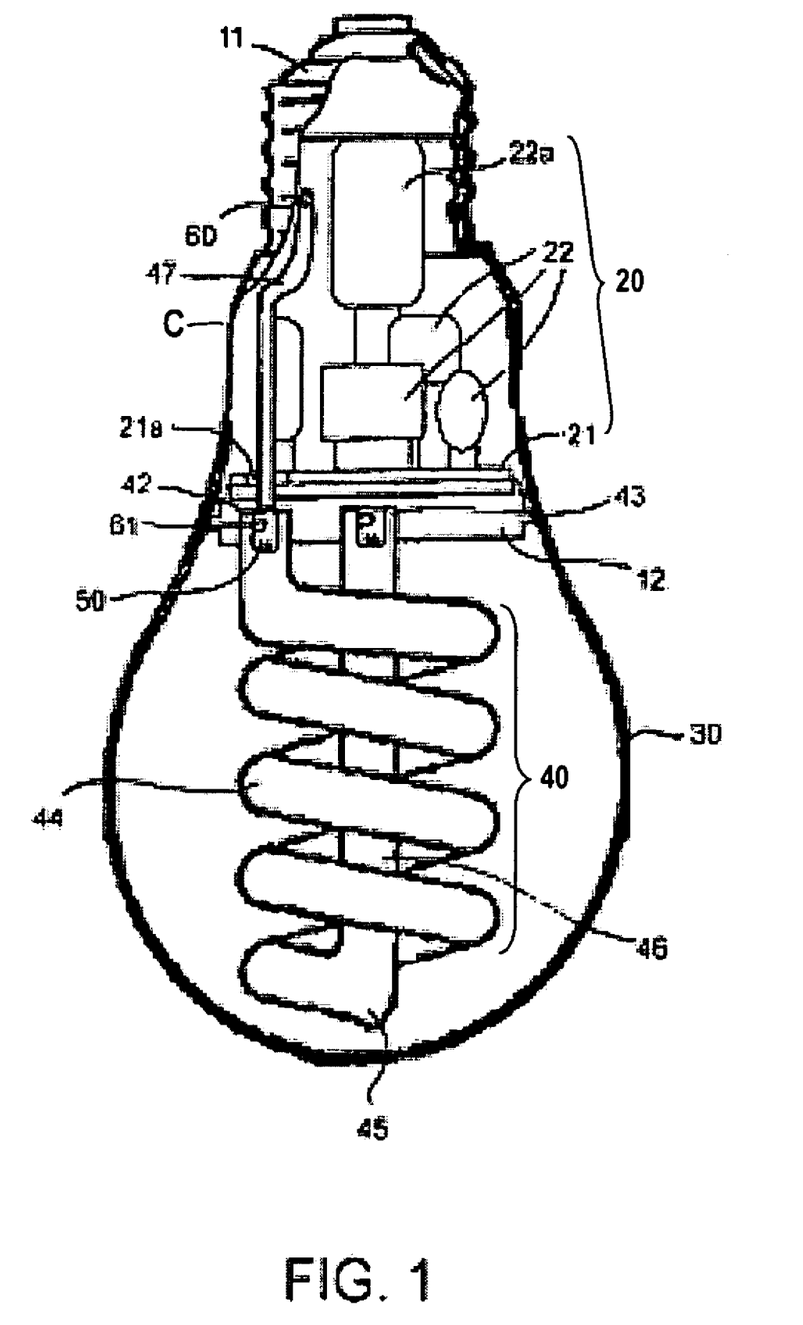
FIG. 1 is a partial sectional front view showing the first embodiment of the present invention.

FIG. 1 shows the first embodiment of a compact fluorescent lamp.

As shown in FIG. 1, compact fluorescent lamp 10 is equipped with a fluorescent tube 40, a lighting device 20, a holder 11, a cap 11, a cover C, and a globe 30. The globe 30, the holder 12 and the cap 11 constitute an envelope 15. The envelope 15 is shaped in a profile approximating to that of ordinary incandescent lamps with 60 W rated-powers. Here, the term "ordinary incandescent lamp" is defined in "JISC7501". The length of the compact fluorescent lamp 10, i.e., the size of the envelope 15 from the head of the cap 11 to the head of the globe 30, is 110-125 mm. The maximum diameter of the compact fluorescent lamp 10, i.e., the diameter of the glove globe 30, is 50-60 mm. Here, the diameter of the holder 12 is formed in broadly around 40 mm.

On the inner surface of fluorescent tube 40, a protective film (not shown) made of alumina is applied, and further a fluorescent substance layer (not shown) is applied on the protective film. The fluorescent substance layer comprises a three band emission fluorescent substance. As a red emission phosphor in them, europium-activated yttrium oxide phosphor with a peak wavelength around 610 nm is employed. As a blue emission phosphor, europium-activated barium aluminate-magnesium phosphor with europium with a peak wavelength around 450 nm is employed. As a green emission phosphor, cerium-terbium activated lanthanum phosphate phosphor with cerium terbium with a peak wavelength around 540 nm is employed. Here, a mixture of phosphors which emit other luminescence colors can be employed in place of the above phosphors as the three band emission fluorescent substance. Here the fluorescent substance layer is applied on the inner surface of the fluorescent tube 40 after the fluorescent tube 40 had been helically shaped.

The fluorescent tube 40 has a short straight portion 46 and a helical portion 44 connected to the straight portion 46 at a turning portion 45. The straight portion 46 protrudes through the helical central axis of the helical portion 44. Tube ends 42 and 43 of the fluorescent tube 40 juxtapose with each other in the same direction.

The fluorescent tube 40 has an outer tube diameter in the range of 8.0-13 mm, or preferably 9.0-13 mm, and a wall thickness in the range of 0.5-1.5 mm. The meat thickness is made of glass. The fluorescent tube 40 has a discharge path, and the discharge path has the length in the range of 250-600 mm, or preferable in the range of 250-500 mm. The fluorescent tube 40 has a rated lamp input power in the range of 8-25 W. Since helical fluorescent tubes are manufactured through a complicated process, a temperature difference arises over entire of the tube. As a result, helical fluorescent tubes are easy to be deformed and deteriorated their mechanical strength. The extents of the deformation and the deterioration are greatly dependent on the outer tube diameter and the wall thickness of the fluorescent tube. When the outer tube diameter is smaller than 9.0 mm, or when the wall thickness is thinner than 0.5 mm, the fluorescent tube is easy to be broken awkwardly by external force acting thereon at the time of handling the fluorescent tube. The compact fluorescent lamp is able to have a lamp efficiency close to that of incandescent lamp, by using glass tube with an outer tube diameter in the range of 9.0-13 mm, a discharge path length in the range of 250-500 mm, and making the rated lamp input power in the range of 8-25 W. If the length of the discharge path is in the range of 250-500 mm, and the rated lamp input power is in the range of 8-25 W, the lamp efficiency of the fluorescent tube will be improved much further.

In order to make a hot forming of the fluorescent tube easy, generally lead glass with a low apparent initial softening is employed. However lead affects the environment. Therefore, it is preferable to avoid lead. When using sodium glass, in the hot forming of the fluorescent tube, sodium constituent deposits at the time of hot forming the fluorescent tube, and the deposited sodium reacts with a phosphor. Thus, the phosphor tends to deteriorate. Therefore, by making a bent-shape fluorescent tube substantially lead-free, sodium oxide be 10 mass % or less, it is able to reduce an affection to the environment, and depress degradation of phosphor, thereby improving a light flux retention. The glass employed for a bent-shape fluorescent tube has a following composition, i.e., 60-75 mass % of silicon dioxide; 1-5 mass % of aluminum oxide (alumina); 1-5 mass % of lithium oxide; 5-10 mass % of sodium oxide; 1-10 mass % of potassium oxide; 0.5-5 mass % of calcium oxide; 0.5-5 mass % of magnesium oxide (magnesia); 0.5-5 mass % of strontium oxide; and 0.5-7 mass % of barium oxide. And wherein, it satisfies equations of "strontium oxide/barium oxide >=1.5" and "strontium oxide+barium oxide <=strontium oxide." It is confirmed that the fluorescent tube employing that glass is enhanced superior to the fluorescent tube employing lead glass in the light flux rise-up. However, the reason is not evident.

The ends 42 and 43 of the helical fluorescent tube 40 are closed in the manner of a pinch seal etc. And a thin tube 47 with an inner diameter of 2-5 mm is provided on one of the tube ends. In the thin tube 47, a main amalgam 60 is enclosed.

In the tube end 42 and 43 of the helical fluorescent tube 40, filament coils constituting discharge electrodes 50 are mounted by being supported on welds, respectively. Each weld is connected to lead wires led out the exterior of the helical fluorescent tube 40 through dumet wires hermetically attached to the tube ends 42 and 43 in the manner of the pinch seal etc. Two pairs of lead wires, i.e., four lead wires led out from the tube ends 42 and 43 are electrically connected to the lighting device 20

An auxiliary amalgam 61 is placed on the weld supporting discharge electrodes 50, 50 to the tube end 42 and 43. As for auxiliary amalgam 61, gold or silver is plated by the thickness of about 3 micrometers at vertical 2 mm, width 7 mm, and the piece of stainless steel with a thickness of 40 micrometers. The auxiliary amalgam 61 is constituted in a form of gold of silver piece, or a plating of gold or silver on a piece of a stainless steel or a weld, and mounted in the vicinity of any one of the discharge electrodes or a desired portion in the discharge path. Here, the auxiliary amalgam 61 can be placed in the fluorescent tube 40 in freely movable state, or placed on any position in the fluorescent tube 40 through a holding member.

It is preferable that the thin tube 47 provided on one of the tube ends 42, 43 protrudes in the length of 15-50 mm so as that the tip end of the thin tube 47 resides in the vicinity of the cap 11 or inside the cap 11. Here, in this embodiment, the thin tube 47 protrudes in the length of 45 mm as a rectilinear. The thin tube 47 is arbitrarily bent so that it may not contact to the inner wall of the holder 12, and has a height of about 40 mm from the tube end to the tip end.

The main amalgam 60 is an alloy comprised of mercury in the range of 12-25 mass %, bismuth in the range of 50-65 mass %, and tin in the range of 35-50 mass %

The fluorescent tube 40 has a height of 50-60 mm from the tube end 42 or 43 to the turning portion 45, and a discharge path in the length of 200-350 mm.

The discharge gas occupied by argon with 99% or more is filled in the fluorescent tube 40 at a pressure of 400-800 Pa.

Hereafter, the present embodiment will be explained as that the compact fluorescent lamp takes a posture in which the cap 11 is in the upper side and the globe 30 is in the lower side.

Tube end 42 and 43 of the fluorescent tube 40 is attached to the undersurface of the holder 12. The holder 12 is coupled to the lower opening end of the holder 12 so as that the holder 12 is covered the holder 12. A circuit board 21 constituting the lighting device 20 is attached on the upper surface of the holder 12. Two or more circuit elements 22 are mounted on the upper surface of the circuit board 21, i.e., in the side facing the cap 11. The circuit elements 22 constitute a high frequency lighting circuit for lighting up the fluorescent tube 40 at a high frequency power.

A through-hole 21a of about 6 diameter mm is defined in the circuit board 21, and then the thin tube 47 protrudes through the through-hole 21a to the vicinity of the cap 11. The circuit elements 22, include, e.g., electrolytic capacitors, e.g., 22a, inductors, transformers, resistors, film capacitors, etc. Small electronic devices in the nature of relatively heat-resistancy, such as field effect transistors, rectifier diodes, chip resistors (not shown), are mounted on the undersurface of the circuit board 21, i.e., on the side facing the fluorescent tube 40. The electrolytic capacitor 22a has a tall body and extends much higher than the other low body circuit elements in the nature of relatively high heat effluence such field effect transistors, transformers, current-limiting inductor, resistors, resonance capacitors to the vicinity of the cap 11. The main amalgam 60 is accommodated in the thin tube 47 at a portion protruding in the vicinity of both of the head of the electrolytic capacitor 22a and the cap 11. Therefore, the main amalgam 60 recedes from the upper surface of the circuit board 21 by about 40 mm.

The holder 12 is made of heat-resistant synthetic resin, such as poly butylene terephthalate. The holder 12 has a cylindrical shape whose upper and lower sides open, the lower side still expands downward, and the upper opening end is attached with a Type-E26 cap.

The globe 30 is made of transparent or light diffusive milk white glass or synthetic resin. The appearance and the size of the globe 30 are almost the same as glass bulb of the ordinary incandescent lamps of 60 W rated powers. The upper opening end of the globe 30 is fit inside the lower opening end of the holder 12. In addition, a diffusion film etc. can be applied on the inner or outer surface of the globe 30 so as to unify the brightness of the lamp.

The circuit board 21 is formed in almost round disk-shape, and has a diameter 12 times or less the maximum tube diameter of the fluorescent tube 40.

The lighting device 20 is so constituted that the fluorescent tube 40 is lighted up at a current density (current per sectional area) of 3-5 mA flowing in the fluorescent tube 40 by the lamp electric power of 7·15 W. In this embodiment, for example, the input power rating is set in 12 W, the lamp current is set in 190 mA, the lamp voltage is set in 58 V, and the total light flux of the fluorescent tube 44 is set in about 810 lm.

Since the light distribution usually resembles the light distribution of ordinary incandescent lamp, even if the compact fluorescent lamp constituted as above is employed in place of ordinary incandescent lamps, an emitted light to the reflector around a socket of luminaire equipping the compact fluorescent lamp is fully obtained. Therefore, characteristic just as design values of the reflector for ordinary incandescent lamps is obtained. Since the light distribution of compact fluorescent lamps usually resembles that of the ordinary incandescent lamps, even if it is employed in luminaire like a light stand in which the light bulb is seen through a shade, the compact fluorescent lamp can be employed without feeling discomfort.

Figure 2:
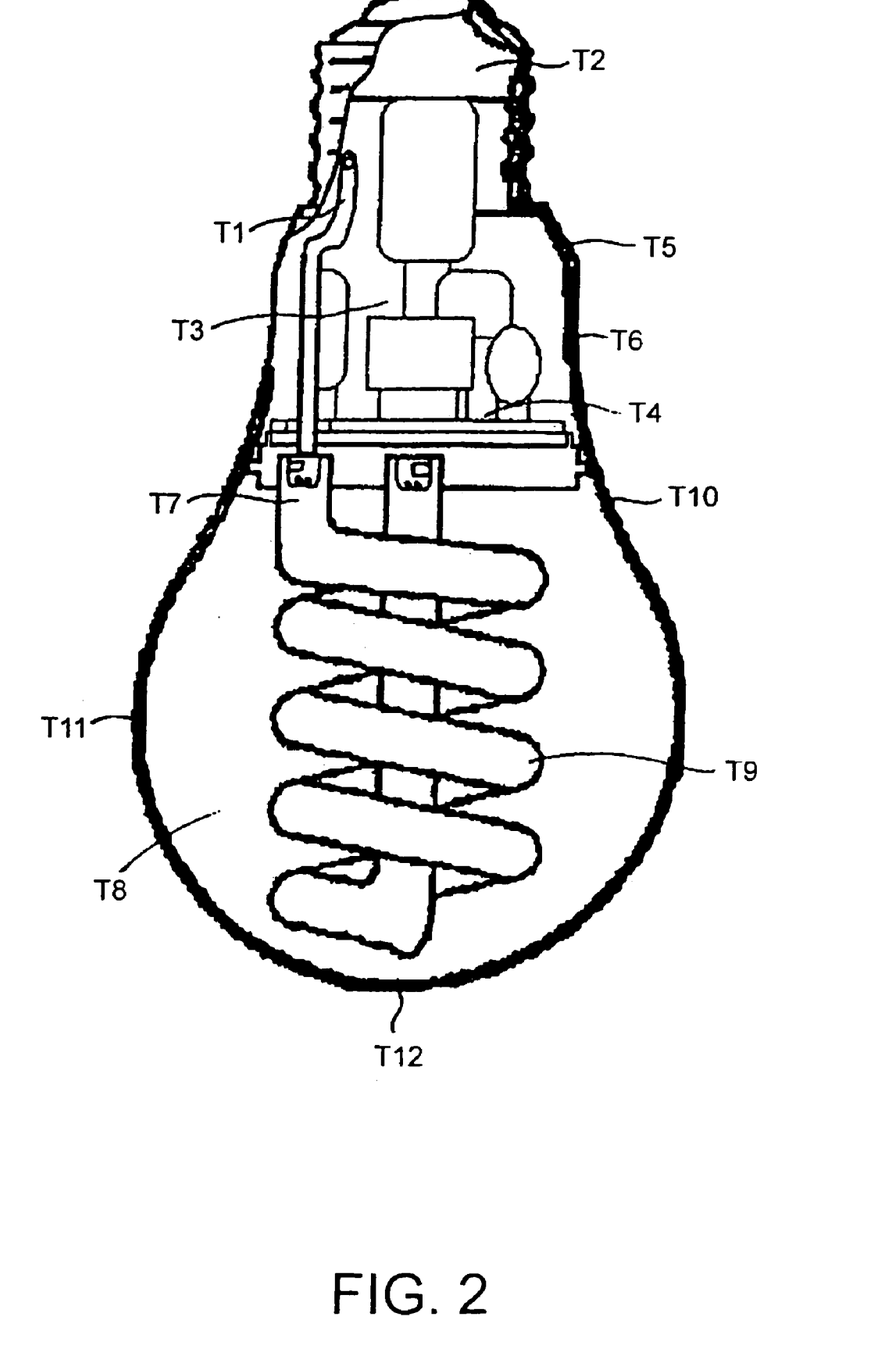
FIG. 2 is a sectional front view for explaining the temperature distribution under light-up of the compact fluorescent lamp of FIG. 1.

Referring now to FIG. 2, an operation of the embodiment is will be explained.

FIG. 2 is a sectional front view for explaining the temperature distribution under light-up of the compact fluorescent lamp of FIG. 1. The temperature distribution seen in FIG. 2 had been measured in a calm circumference, and in a lighting-up state and a posture where the cap 11 side faces upper side and the globe 30 faces lower side under the temperature of 25 degrees C. In this situation of the compact fluorescent lamp 10, about 10% of 12.1 W input powers are consumed in the lighting circuit.

The temperatures on the locations designated in the drawing were as follows.

a) The temperature T1 at the surface of the thin tube 47 on the position where the main amalgam 60 is placed . . . 55 degrees C.;
b) The temperature T2 inside the cap 11 . . . 53 degrees C.;
c) Temperature T3 on the central position inside the holder 12 (i.e., in the vicinity of the heads of the high heat evolution circuit elements) . . . 62 degrees C;
d) Temperature T4 on the upper surface of the circuit board 21 . . . 98 degrees C;
e) Temperature T5 on the outer surface of the upper section of the holder 12 . . . 62 degrees C;
f) Temperature T6 of the outer surface of the intermediate section of the holder 12 . . . 62 degrees C;
g) The temperature T7 on the outer surface of the tube ends 42 and 43 of the fluorescent tube 40 . . . 158 degrees C.;

h) The temperature T8 on the outer surface of the portion of the fluorescent tube 40 corresponding to a positive column developing portion . . . 136 degrees C.;

i) The temperature T9 on the outer surface of the helical portion 44 . . . 106 degrees C.;

j) Temperature T10 on the outer surface of the globe 30 . . . 81.degree. C.;

k) Temperature T11 on the outer surface of the maximum diameter portion of the k globe 30 . . . 60 degrees C.; and l) Temperature T12 on the outer surface of the lower side of the globe 30 . . . 57 degrees C;

As seen from the temperature distribution, the vicinity of the lighting device 20 has a high temperature. This is because that the lighting device 20 is easy to be heated by the fluorescent tube 40 which is a source of generating heat, and more especially by ballast windings, transistors etc. constituting high heat evolution circuit elements in the lighting device 20. As compared to that, the vicinity of the cap 11 has a relatively low temperature. Therefore, the temperature of the main amalgam 60 can be lowered to a desired temperature by placing the main amalgam 60 in the vicinity of the cap 11. The electrolytic capacitor 22a close to the main amalgam 60 is a circuit element hardly generating heat. Therefore, the vicinity of the cap 11 is kept at a temperature around 50-60 degrees C.

Incidentally, when measured the temperature of the main amalgam enclosed in a short thin tube of about 10 mm or less like conventional example, the main amalgam 30 had a very high temperature of about 90 degrees C. As compared to that, in this embodiment with a long thin tube where the main amalgam 60 is located on the position of the thin tube protruding to the vicinity of the cap 11, the temperature of the main amalgam 60 was decreased to about 30 to 40 degrees C.

In this embodiment, a proper amount of mercury vapor is emitted from the auxiliary amalgam just after the lighting start. The light flux had then risen promptly without occurring phenomenon caused the shortage of mercury. As a result, it is confirmed that at the time of five seconds elapsed from the lighting start, the light output about 50% of that in the steady state light-up was obtained. It is also found that, at the time of about 25-second elapsed from the lighting start, the light output about 85% of that in the steady state light-up was obtained.

Figure 3:
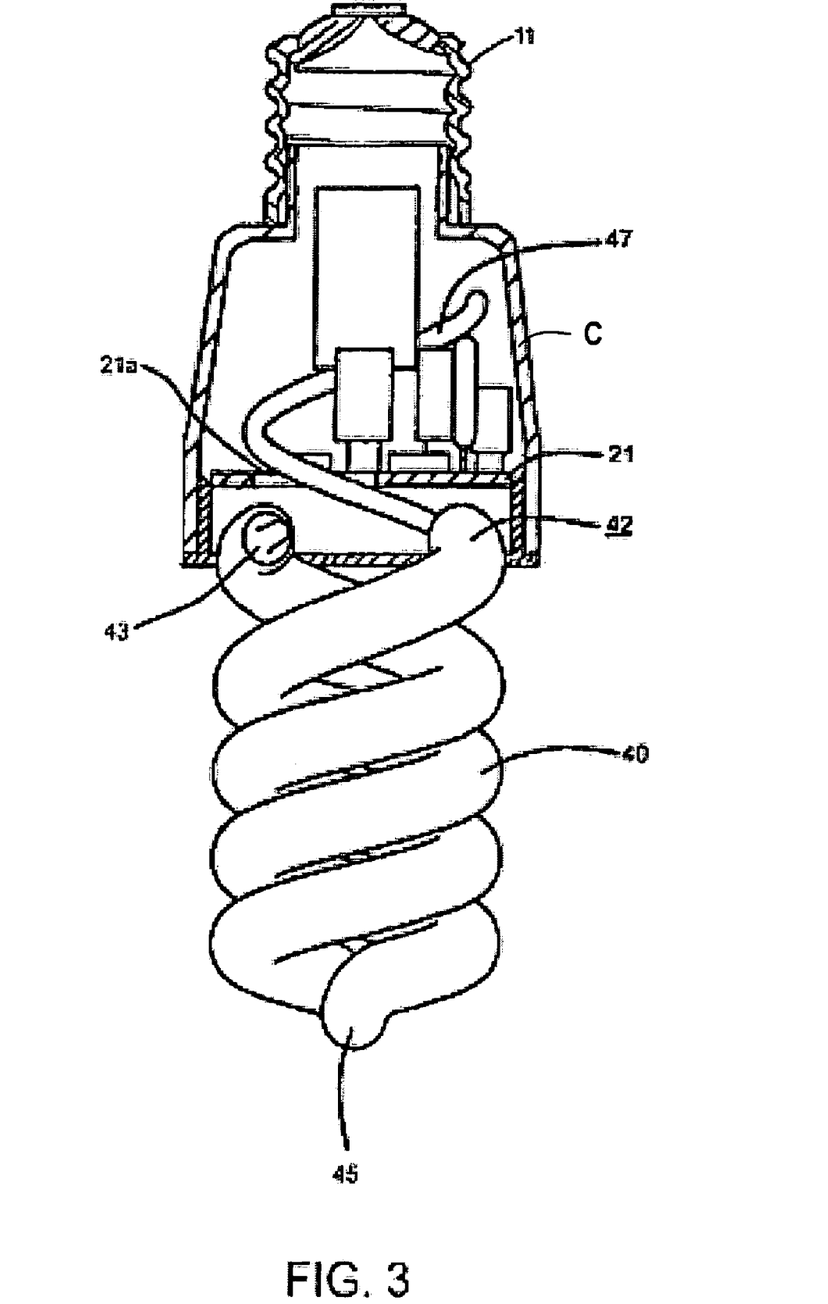
FIG. 3 is a partial sectional front view showing the second embodiment of the present invention.

Referring now to FIG. 3, a second embodiment of the present invention will be explained.

FIG. 3 is a partial sectional front view showing the second embodiment of the compact fluorescent lamp. Here, the same reference numerals are added to the same or corresponding portions as of the first embodiment shown in FIG. 1, and the detailed explanation is omitted.

In the second embodiment, a pellet type zinc amalgam containing the mercury below 10 mg is enclosed in the fluorescent tube 40 in place of the main amalgam.

The fluorescent tube 40 constitutes a helical fluorescent tube wherein a straight glass tube is folded at the turning portion 45 around its central portion, and the entire of both sides arranged in parallel are constituted in a double-helical fluorescent tube by being helically revolved in the same direction. And a thin tube 47 helically protrudes from one of the tube ends 42 along the line of the corresponding one of the helical fluorescent tubes.

The tube end 42 of the fluorescent tube 40 is fit outside the holder 12 holding the fluorescent tube 40, and through-holes along which a thin tube 47 passes is defined in it. These through-holes are so defined that their inner walls fit the helical outer surfaces of the tube ends 42 and 43.

Here, the helical thin tube 47 protruding from the one of the tube ends 42 passes through one of the through-holes in the manner that it is helically revolved. After that, both of the tube ends 42, 43 are fit into the through-holes in the manner that they are helically revolved in similar to the helical thin tube 47. Here, the circuit board 21a of the lighting device 20 is defined a through-hole 21a along which the thin tube 47 passes therethrough. The tube ends 42 and 43 of the fluorescent tube 40 are firmly fixed to the holder 12 by using silicone adhesive.

In this second embodiment, the mercury vapor pressure characteristic is substantially equivalent to that of ordinary fluorescent lamps which is filled with mercury itself. Therefore, the light output during steady state lighting is not deteriorated, and the light flux rise-up characteristic is enhanced.

Here, in this second embodiment, a wide space resides in the turning portion 45. For this reason, when the compact fluorescent lamp takes a posture in which the turning portion 45 is in the lower side, a cool spot is induced on the turning portion 45, and the cool spot optimally controls the mercury vapor pressure in the fluorescent tube 40. On the other hand, when the compact fluorescent lamp the takes a posture in which the turning portion 45 is in the upper side, the thin tube 47 is protruded to the vicinity of the cap 11 and the temperature around the tip end of the thin tube is set to 70 degrees C. or less so as that the thin tube 47 is hardly affected by the fluorescent tube 40. As a result, if set up such—a convection heat from the fluorescent tube 40 to the vicinity of the cap 11 is shielded by the circuit board 21, and a conduction heat from the fluorescent tube 40 to the tip end of the thin tube 47 is also reduced.

In this manner, in this second embodiment, even if the fluorescent tube 40 is heated, excess mercury vapor in the fluorescent tube 40 is condensed at the tip end of the thin tube 47 protruding in the vicinity of the cap 11 or the cool spot around the turning portion 45 of the fluorescent tube 40, and thus the mercury vapor pressure is kept adequate. Furthermore, since the mercury vapor pressure is kept in a certain value without decreasing too much in a light-out time, as compared to the case that a main amalgam is employed, the light flux rise-up characteristic just after the lighting start is enhanced. Here, in this second embodiment, the light flux rise-up characteristic can be enhanced by using an auxiliary amalgam similar to that in the first embodiment.

When a short thin tube is welded to the tube end 42 of the fluorescent tube 40, there raises fears of occurring cracks in the fluorescent tube 40 due to the high temperature according to the heat of the welding and gas leaks through the cracks. However, in this embodiment, since the thin tube 47 is longly protruding, the thin tube 47 has a large heat capacity by just that much. As a result, the temperature rise of the fluorescent tube 40 is mitigated, and an occurrence of crack is depressed. Furthermore, since the heat dissipation from the thin tube 47 increases, the depression effect of crack generating of the fluorescent tube is promoted.

Here, even if the helical fluorescent tube is any one of the modifications shown in FIGS. 4a to 4e, it becomes possible to achieve the same operation and effect as those in the first and the second embodiment.

Figure 4A:
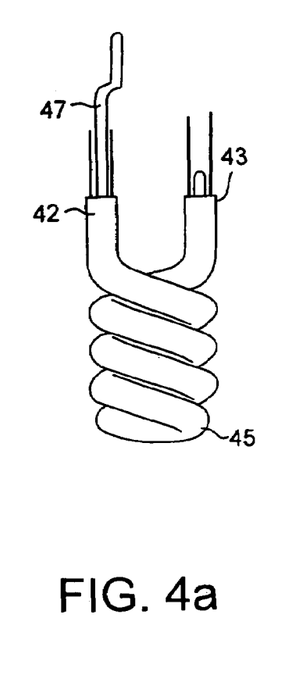
FIGS. 4a to 4e are front views showing the various modifications helical fluorescent tubes.

The fluorescent tube 40 as shown in FIG. 4a has a gradual turning portion around a central portion, and both ends shaped in helical. A thin tube 47 is protruded from at least one of the straight tube ends 42, 43 in similar to the first embodiment. The fluorescent tube 40 as shown in FIG. 4a is able to have a discharge pass length longer than that of the first embodiment.

Figure 4B:
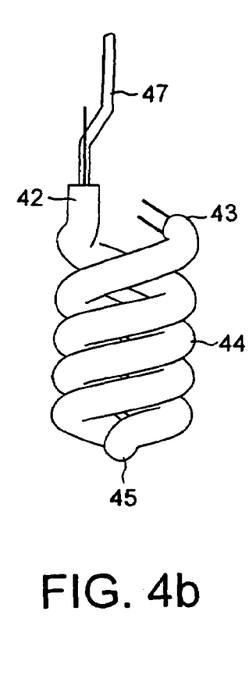

The fluorescent tube 40 as shown in FIG. 4b has a steep turning portion around a central portion, a straight tube end left without shaping in helical and a helical tube end shaped continually the same as the helical portion. In this modification, the internal volume of the turning portion 45 is expanded rather than those both-side portions. A long thin tube 47 is protruded from the straight tube end 42, in similar to the first embodiment. In the fluorescent tube 40 as shown in FIG. 4b, the tube end for mounting the thin tube is straight, the holder 12 and the circuit board 21 through which the thin tube is protruded is simply constructed.

Figure 4C:
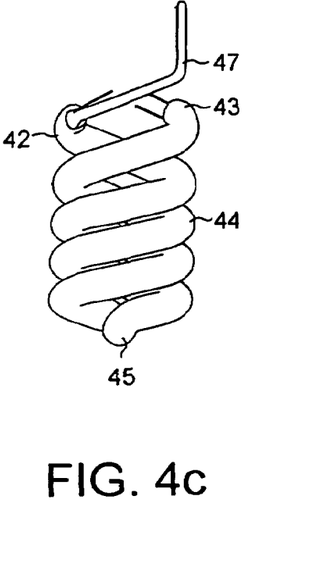

The fluorescent tube 40 as shown in FIG. 4c is generally the same as the fluorescent tube in the second embodiment except that both tube ends are entirely shaped in helical and the thin tube is protruded from one on the helical tube ends along the line of the helical tube and the end portion of the thin tube protrudes in straight to the vicinity of a cap (not shown).

Figure 4D:
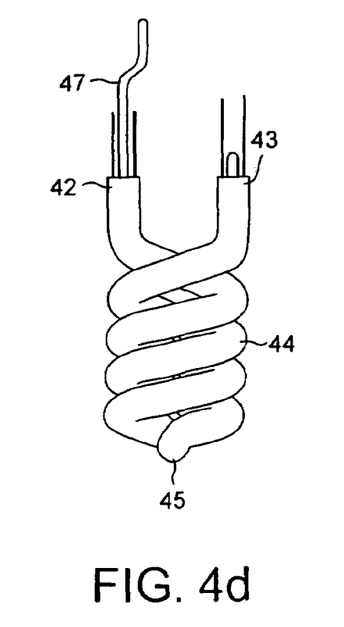

The fluorescent tube 40 as shown in FIG. 4d has helical portion generally the same as that as shown in FIG. 4b and the tube ends 42, 43 generally the same as those as shown in FIG. 4a.

Figure 4E:
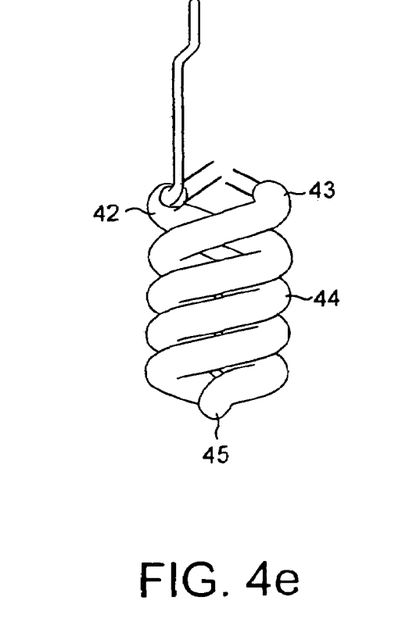

The fluorescent tube 40 as shown in FIG. 4e has a helical portion generally the same as that as shown in FIG. 4c, and a thin tube 47 protruding from a tube end 42 on one hand straight through along the central axis of the lamp.

In each fluorescent tube 40 as shown in FIGS. 4a to 4e, a protective film and a fluorescent substance layer are, for example, applied as follows. First, a branching tube (not shown) is mounted on the turning portion 45 of the fluorescent tube 40 and before closing the fluorescent tube 46, the tube ends 42 and 43 are turned upward, and liquid protective film substance is poured into the fluorescent tube 40, and then the liquid protective film material is run off from the branching tube on the turning portion 45. As a result, a protective film is applied to the inner surface of the fluorescent tube 40. At that time, a protective film piles up so thickly that it becomes a lower part to the inner surface of the fluorescent tube 40. Therefore, the protective film around the tube ends 42 and 43 is relatively thinner, and the protective film around the turning portion 45 is relatively thicker.

Next, the turning portion 45 is turned upward, and a liquid fluorescent substance is poured into the fluorescent tube 40 through the branching tube, and then the liquid protective film material is run off from the tube ends 42 and 43. As a result, a fluorescent substance layer is applied on the protective film of the inner surface of the fluorescent tube 40. At that time, a fluorescent substance layer piles up so thickly that it becomes a lower part to the inner surface of the fluorescent tube 40. Therefore, the fluorescent substance layer around the tube ends 42 and 43 is relatively thicker, and the fluorescent substance layer around the turning portion 45 is relatively thinner.

As a result, the unevennesses of the thickness of the protective film and the fluorescent substance layer are offset mutually, and since the total thickness of coating becomes uniform, and thus the lightness like each part of the fluorescent tube are equalized.

Here, the direction of the fluorescent tube can be reversed between the application process of the protective film and the application process of the fluorescent substance layer. The branching tube provided on the turning portion 45 In order to apply the protective film and the fluorescent substance layer is cut off after the completion of the application process. The marks of branching tube are closed.

Figure 5:
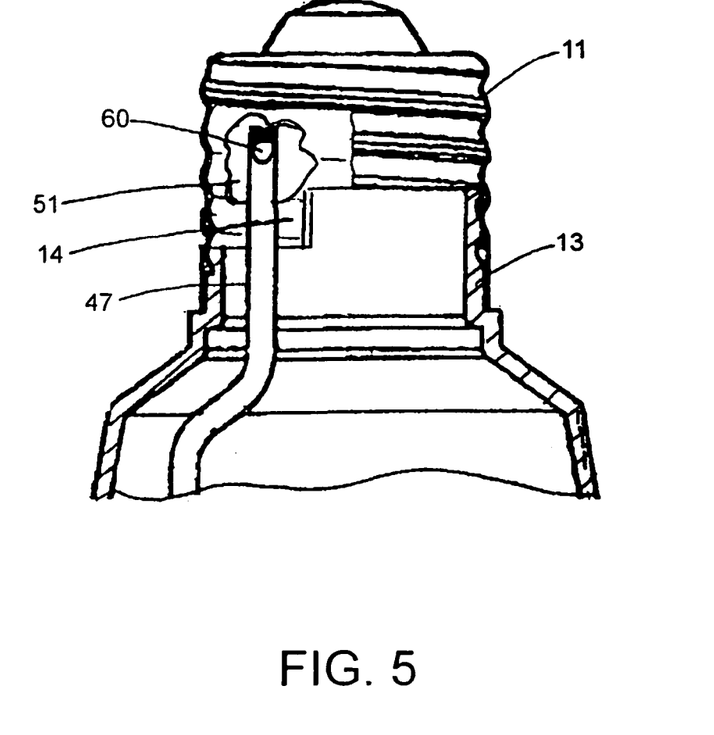
FIG. 5 a partial sectional front view showing the principal part of the second embodiment of the present invention.

Referring now to FIG. 5, a third embodiment of the present invention will be explained. FIG. 5 is a sectional view showing a principal part of the third embodiment of the compact fluorescent lamp. Other portions omitted in FIG. 5 may be any construction of the above embodiments. Those portions can be changed suitably.

In this third embodiment, the main amalgam 60 is placed in the tip end of the thin tube 47, and the tip end of the thin tube 47 is adhered to the inner surface of the cap 11 by using a silicone adhesive 51. A cutout 14 is defined around the neck 13 of the holder 12 to be mounted with the cap 11, and then the tip end of the thin tube 47 is adhered to the inner surface of the cap 11.

In this third embodiment, the tip end of the thin tube 47 and if necessary the circuit elements such as the electrolytic capacitor located in the vicinity of the tip end of the thin tube are preliminarily applied the silicone adhesive, and then mechanically and thermally coupled to the cap 11 by the silicone adhesive at the time that the cap 11 is attached to the holder 12.

Now, a result of measuring temperatures in the compact fluorescent lamp having the fluorescent tube as shown in FIG. 4e will be explained. The measurement was performed in the case that the tip end of the thin tube 47 was isolated from the inner surface of a cap 11, and the case that he tip end of the thin tube 47 was thermally coupled to the inner surface of the cap 11.

In the case that the tip end lamp current of the thin tube 47 was isolated from the inner surface of the cap 11, following results are obtained, i.e., the lamp voltage . . . 86 V, the lamp current 0.21 A; the lamp power 17.9 W, and the temperature of the main amalgam 60 . . . 79 degrees C. In the case that the tip end of the thin tube 47 was thermally coupled to the inner surface of a cap 11, following results are obtained, i.e., the lamp voltage . . . 95 V, the lamp current . . . 0.207 A; the lamp power . . . 19.3 W, and the temperature of the main amalgam 60 . . . 69 degrees C. From the above result, it was confirmed that he main amalgam 60 in the latter case is decreased by 10 degrees C. in compared to the former case.

Figure 6:
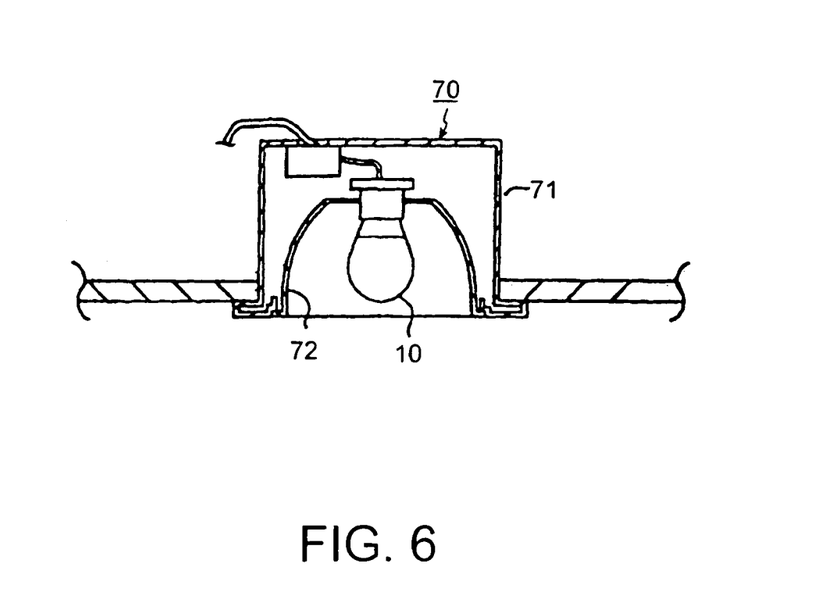
FIG. 6 is a schematic cross-section showing the luminaire which is another embodiment of the present invention.

Referring now to FIG. 6, luminaire according to still another embodiment of the present invention will be explained FIG. 6 is a schematic cross-section showing the embodiment of the luminaire. In FIG. 6, numeral 10 denotes a compact fluorescent lamp, and numeral 70 denotes a ceiling mount type luminaire. The ceiling mount type luminaire 70 is principally comprised of a ceiling mount box 71 and a reflector 72.

The compact fluorescent lamp according to one aspect of the present invention comprises a fluorescent tube having a helical portion on at least a part thereof and turned down in the middle, a pair of tube ends thereof each provided with a discharge electrode, the pair of tube ends juxtaposing with each other in the same direction. As a result, the compact fluorescent lamp is able to have a small dimension and a relatively long discharge path. A thin tube is protruded from at least one of the tube ends of the fluorescent tube in the cover C, and the thin tube is communicated with the fluorescent tube. A part of the thin tube can be set at a temperature by that a mercury vapor pressure maximizing the luminous efficiency is obtained, by protruding the thin tube to the vicinity of the cap. As a result, the luminous efficiency of fluorescent tube is enhanced, as compared to conventional amalgam with low mercury vapor pressure.

Another aspect of the compact fluorescent lamp according to the present invention is able to relatively lengthen the thin tube.

Still another aspect of the compact fluorescent lamp according to the present invention is able to adequately decrease the temperature of the thin tube.

Still another aspect of the compact fluorescent lamp according to the present invention is able to induce a cool spot on the thin tube in the vicinity of the cap, since the thin tube is protruded in the vicinity of the cap. As a result, the mercury vapor pressure characteristic in the fluorescent tube is enhanced, a light output is not deteriorated, and the light flux rise-up characteristic is enhanced.

Still another aspect of the compact fluorescent lamp according to the present invention is able to enhance the light flux rise-up characteristic by optimizing the composition of the main amalgam.

Still another aspect of the compact fluorescent lamp according to the present invention is able to improve the delay of light flux rise-up just after the lighting start, since the composition of the auxiliary amalgam is optimized Still another aspect of the compact fluorescent lamp according to the present invention is able to give a favorable dimension and a favorable total light flux conditions of the compact incandescent lamp with rated power comparable to that of incandescent lamp.

Still another aspect of the present invention is able to provide luminaire equipped with any one of the above aspect of the compact fluorescent lamp.

What is claimed is:

1. A compact fluorescent lamp, comprising:
   a fluorescent tube having a helical portion on at least a part of the fluorescent tube and turned down in the middle of the fluorescent tube, a pair of tube ends of the fluorescent tube, each end provided with a discharge electrode, the pair of tube ends juxtaposing with each other in the same direction;
   a holder configured to hold the tube ends so as that the fluorescent tube is supported at one side of the holder;
   a lighting device configured to supply a high-frequency power to the fluorescent tube, the lighting device comprising a circuit board facing the other side of the holder and circuit elements mounted on the circuit board;
   a cover configured to accommodate the lighting device, the cover having an opening at both ends of the cover and holding the holder at one opened end;
   a cap fixed to the other opened end of the cover configured to supply commercial frequency power to the lighting device by being mounted to a socket of luminaire; and
   a thin tube that communicates with the fluorescent tube and protrudes by 25-70 mm from at least one of the tube ends of the fluorescent tube in the cover and extends to a vicinity of the cap.

2. A compact fluorescent lamp according to claim 1, wherein the thin tube is located in an area that a surface temperature of at least a pan of the thin tube becomes 40-70 degrees C.

3. A compact fluorescent lamp according to claim 1, wherein the thin tube is protruded in an interior of the cap.

4. A compact fluorescent lamp according to claim 3, wherein the thin tube is thermally coupled to the cap.

5. A compact fluorescent lamp according to claim 1, wherein the circuit elements include an electrolytic capacitor and at least another element protruding from the circuit board, wherein the electrolytic capacitor protrudes higher than the at least another element, and
   wherein the thin tube protrudes substantially to the same height with the electrolytic capacitor.

6. A compact fluorescent lamp according to claim 1, wherein the thin tube is protruding by 5-50 mm from the circuit board.

7. A compact fluorescent lamp according to claim 1, wherein the thin tube has a helical portion on at least a part thereof.

8. A compact fluorescent lamp according to claim 1, wherein the fluorescent tube is filled with a discharge gas containing at least mercury and having vapor pressure characteristic substantially the same with that given by mercury itself, and a cool spot controlling a mercury vapor pressure in the fluorescent tube is induced on the helical portion of the fluorescent tube.

9. A compact fluorescent lamp according to claim 1, wherein the thin tube accommodates a main amalgam comprising mercury and at least one of bismuth, lead, zinc and tin, and mercury, and the content of the mercury is more than three mass %.

10. A compact fluorescent lamp according claim 9, wherein the fluorescent tube accommodates an auxiliary amalgam comprising mercury and at least one of gold, silver, palladium, platinum, lead, zinc, bismuth and tin, and the auxiliary amalgam is placed in the vicinity of at least one of the discharge electrodes mounted to the tube ends of the fluorescent tube.

11. A compact fluorescent lamp according to claim 1, wherein the rated lamp power of the fluorescent tube is comparable to that of a 100 W incandescent lamp, the fluorescent tube is accommodated in a globe having a maximum diameter of 65 mm or less, which is attached to the cover, and the entire length of the compact fluorescent lamp across the cap to the globe is 140 mm or less.

12. A compact fluorescent lamp according to claim 1, wherein the rated lamp power of the fluorescent tube is comparable to that of a 60 W incandescent lamp, the fluorescent tube is accommodated in a globe having a maximum diameter of 65 mm or less, which is attached to the cover, and the entire length of the compact fluorescent lamp across the cap to the globe is 109 mm or less.

13. A compact fluorescent lamp according to claim 1, wherein the rated lamp power of the fluorescent tube is comparable to that of a 40 W incandescent lamp, the fluorescent tube is accommodated in a globe having a maximum diameter of 65 mm or less, which is attached to the cover, and the entire length of the compact fluorescent lamp across the cap to the globe is 98 mm or less.

14. Luminaire, comprising:
   a compact fluorescent lamp according to claim 1; and
   a ceiling mount box in which the compact fluorescent lamp is mounted.

* * * * *